United States Patent [19]

Schupbach

[11] 4,261,590

[45] Apr. 14, 1981

[54] WHEELBARROW

[76] Inventor: Elmer J. Schupbach, 936 State Rd., Fenton, Mich. 48430

[21] Appl. No.: 9,438

[22] Filed: Feb. 5, 1979

[51] Int. Cl.³ ............................................... B62B 1/18
[52] U.S. Cl. .................................. 280/47.31; 280/47.32
[58] Field of Search ................ 280/47.3, 47.31, 47.32, 280/47.26

[56] References Cited

U.S. PATENT DOCUMENTS

| 977,056 | 11/1910 | Verplanck | 280/47.31 |
| 2,242,171 | 5/1941 | Boyle | 280/47.31 |
| 3,008,726 | 11/1961 | Vachon | 280/47.33 |
| 3,111,333 | 11/1963 | Marini | 280/47.26 |

FOREIGN PATENT DOCUMENTS

| 1046104 | 12/1953 | France | 280/47.31 |
| 797818 | 7/1958 | United Kingdom | 280/47.31 |

*Primary Examiner*—John P. Silverstrim
*Attorney, Agent, or Firm*—Fisher, Gerhardt, Crampton & Groh

[57] ABSTRACT

A wheelbarrow having a frame including a pair of subframes each made of a continuous length of tubular material and held in spaced apart relationship to each other to form a load carrying platform above and rearwardly of a wheel supported between the subframes.

2 Claims, 6 Drawing Figures

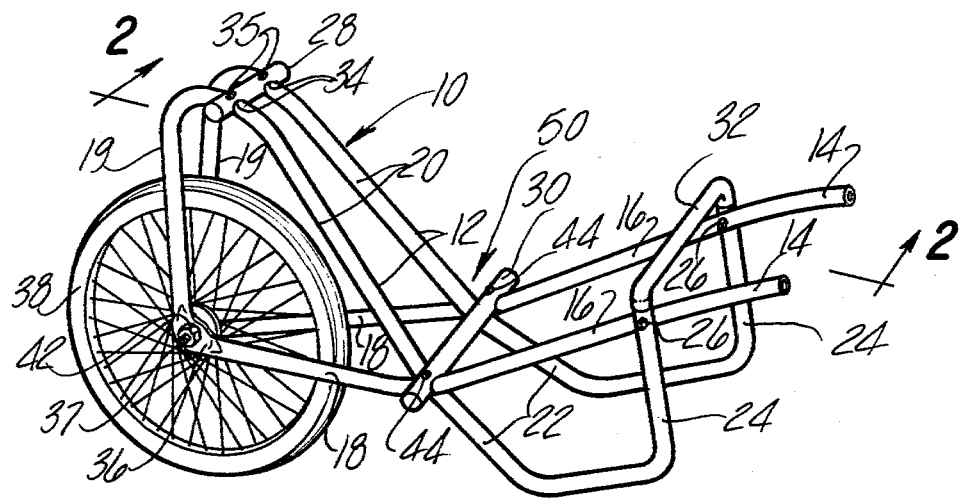
Fig-1
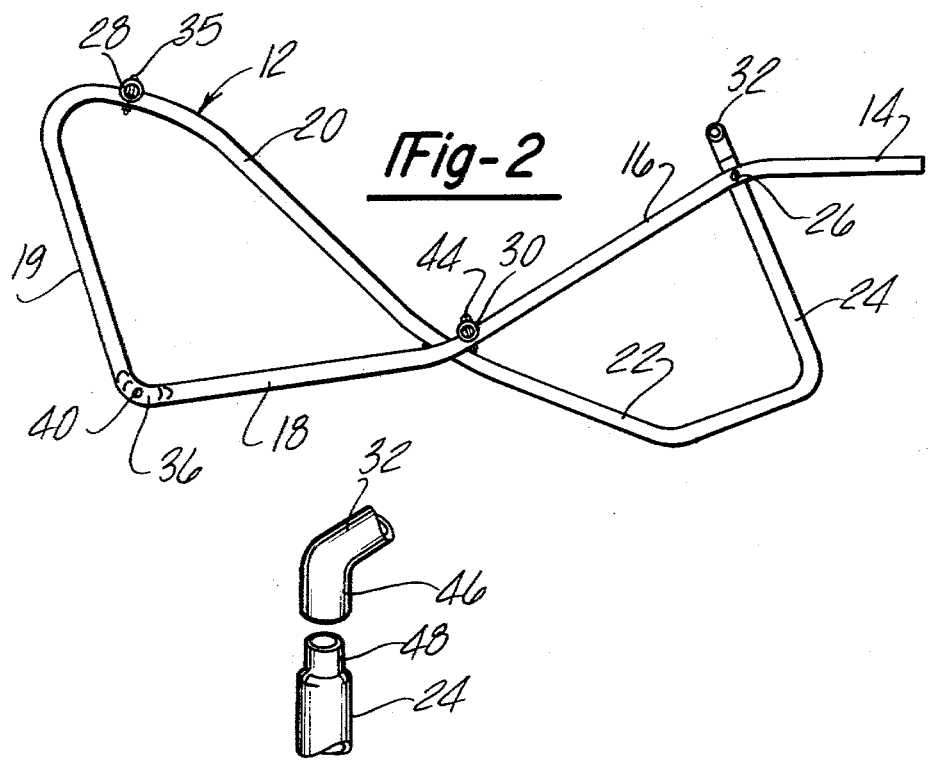
Fig-2
Fig-3

WHEELBARROW

This invention relates to land vehicles and more particularly to single wheeled vehicles such as wheelbarrows.

Many home owners have periodic need for wheelbarrows but conventional wheelbarrows take up considerable space when not in use and are consequently difficult to store. Also, most home owners have access to bicycles and with this in mind, it is an object of the invention to provide a wheelbarrow frame adapted to be used with a bicycle wheel.

A further object of the invention is to provide a light weight wheelbarrow frame which can be easily stored with or without its wheel.

Still another object of the invention is to provide a wheelbarrow frame which can be shipped or stored compactly in subassembled form.

The objects of the invention are accomplished by a wheelbarrow frame made up of a pair of subframes each formed of a continuous length of tubular material and each including an axle receiving portion at the forward end and a ground supporting portion at a lower rearward end. Upper portions of the subframes form a hand grip. The subframes are joined together by a plurality of cross members which may be detachably connected to the subframes so that the subframes together with the cross members define a wheel receiving space within the subframes so that a wheel mounted to the subframes is protected by upper portions of the subframes. Also, upper portions of the subframes define a load carrying platform which is maintained separate from the wheel receiving area.

These and other objects of the invention will become apparent from the following description and from the drawings in which:

FIG. 1 is a perspective view of a wheelbarrow frame embodying the invention;

FIG. 2 is a side elevation of one of the subframes making up the wheelbarrow frame;

FIG. 3 is a perspective view of a portion of the wheelbarrow frame seen in FIG. 1;

Figure 4:
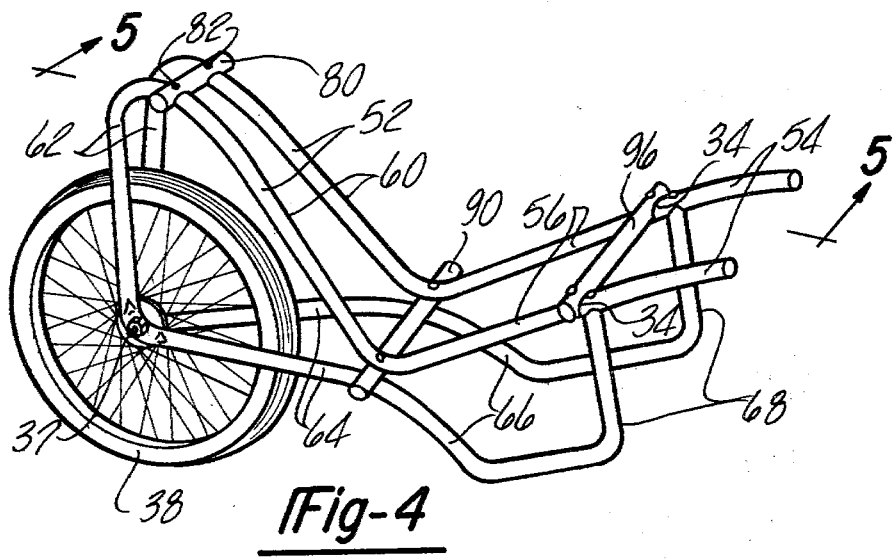
FIG. 4 is a perspective view similar to FIG. 1 but showing another embodiment of the invention.

A wheelbarrow frame embodying the invention is designated generally at 10 in FIG. 1 and includes a pair of subframes 12. Each of the subframes 12 can be made of a substantially continuous metal tube formed in a generally figure eight configuration. The single continuous tube extends from a handle portion 14 at the end of an upper rearward member 16 formed integrally with a forward lower member 18. A vertical frame member 19 extends from the forward lower member 18. The top of the vertical frame member 19 merges with an upper forward member 20 extending and formed integrally with a lower rearward member 22. The lower rearward member 22 forms a ground engaging support and terminates in a vertical portion 24 which is connected to a point forwardly of the handle 14 by means of a bolt 26 extending transversely through the adjacent tubular parts.

The pair of subframes 12 are joined together and held in spaced apart relationship by a plurality of cross members which include a forward cross member 28, an intermediate cross member 30 and a rearward cross member 32.

The forward portions of the subframes 12 are connected together in spaced apart relationship by the forward cross member 28 which is formed with indented portions 34 complementary to the curved outer surface of the upper forward portions or members 20. A pair of bolts 35 pass through the forward cross member 28 and the upper forward members 20 to maintain the upper portions of the subframes 12 in spaced apart relationship to each other. The lower forward end of the subframes 12 are maintained in similarly spaced relationship by means of flattened wheel receiving portions 36 which support an axle 37 of a conventional bicycle wheel 38. The axle 37 is disposed in holes 40 formed in the wheel receiving portion 34 and is held in position by nuts 42.

An intermediate portion of the subframes 12 are held in spaced apart relationship by the intermediate cross frame member 30 which is secured in position by a pair of bolts 44 passing through both the intermediate cross member 30 and the upper rearward member 16 and lower forward member 18 of the subframe 12. The subframes 12 are mirror images of each other in that the lower forward and upper rearward members 18 and 16 are disposed outboard of the upper forward and lower rearward members 20 and 22. A wheel receiving space is defined by the forward and intermediate cross members 28 and 30 and the forward portions of the subframes 12.

The subframes 12 are further held in spaced apart relationship at a rearward end by means of the rear cross member 32. As seen in FIG. 3, the rear cross member 32 has a pair of down turned ends 46, each of which receives a reduced end portion 48 at the upper ends 24 of vertical portions. If desired, the end portions 46 and 48 may be fastened together by a bolt, not shown, passing through both ends.

As a variation, the upper forward portion 12 and lower rearward portion 22 can be formed continuously to form a first frame part. The lower forward portion 18, and the upper rearward portion 14 can also be formed continuously to form a second frame part. The frame parts are joined together at the mid portion by the intermediate cross member 30, at the rearward intersection by fastener 26 and at the forward position by the wheel's axel 37.

The forward and rearward cross members 28 and 32 can be considered to be disposed in a common imaginary plane and the intermediate cross member 30 is disposed below that plane so that the cross members 28, 30 and 32 together with the upper forward members 20 and upper rearward members 16 form an angular load carrying platform designated generally at 50. The platform 50 is particularly adapted for carrying elongated members such as stalks and branches or if desired can be fitted with a frame or other container, not shown, for hauling bulk loads.

Figure 5:
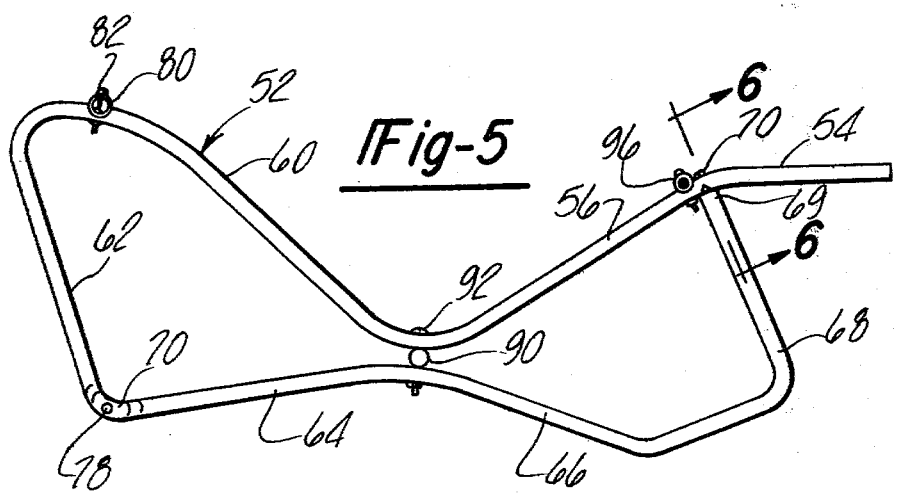
FIG. 5 is a plan view similar to FIG. 2 showing one of the subframes of the wheelbarrow frame seen in FIG. 4.
Figure 6:
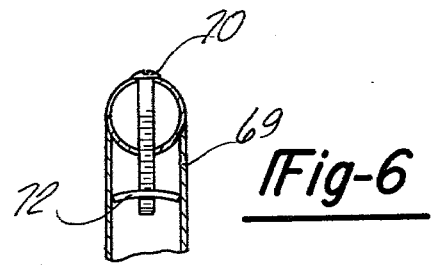
FIG. 6 is a cross sectional view taken on line 6—6 in FIG. 5.

Referring now to FIGS. 4 and 5, another embodiment of the invention is shown in which subframes 52 are also formed of tubular material in a different configuration than that shown in FIGS. 1 and 2. In FIGS. 4 and 5, the subframes 52 are identical to each other and are formed of a continuous length of tubular material in such a manner that each subframe 52 forms a substantially closed loop without any crossed portions. For this purpose hand grips 54 are formed at corresponding ends of elongated tubes and extend therefrom to form upper rearward members 56 merged with and formed integrally with upper forward members 60. Each subframe 52 includes a vertical frame member 62 extending downwardly from the end of the upper forward member 60 to a lower forward member 64 which merges and is formed integrally with a rearward lower member 66. The lower rearward member 66 forms a ground engaging support having a vertical portion 68 with an end indicated at 69 which abuts the lower surface of the upper rearward frame member 56 as shown in FIG. 6. A bolt 70 extends through the upper rearward member 56 just forwardly of the hand grips 54 and is held by a wedge nut 72 disposed within the vertical tubular member 68.

The forward vertical frame part 62 and the lower forward member 64 form a wheel receiving portion 76 at the juncture of the two members and in the assembled condition of the subframes 52 the axle 37 of the bicycle wheel 38 is mounted in holes 78 formed in the wheel receiving portion 76.

The forward ends of the subframes 52 are connected together by a forward cross member 80 which is fastened by bolts 82 to the subframes 52 in substantially the same manner as the forward cross member 28 is connected to the subframes 12 in FIG. 1.

Subframes 52 are further connected together at a intermediate portion through means of an intermediate cross member 90 which is disposed between the upper frame members 56, 60 and lower frame members 64, 66 at their adjacent ends. As seen in FIG. 5, a bolt 92 passes through integral upper members 56 and 60 of subframes 52, the intermediate cross member 80 and integral lower members 64, 66 to hold the subframes 52 in spaced apart relationship.

Rearward portions of the subframe 52 are joined together just forwardly of the hand grips 54 by a rearward cross member 96 which is similar to cross member 80 and has indented portions 34 such as those in the cross member 30 and 32 in the embodiment shown in FIG. 1. The cross member 80 is fastened to the upper rearward frame members by means of bolts 98.

In either embodiment of the invention, the subframes 12 or 52 and the various cross members 28, 30, 32, 80, 90 and 96 may be stored and shipped in disassembled form. When it is desired to form a wheelbarrow, all that is required is to obtain a bicycle wheel which frequently is readily available from a bicycle that is not in use. The bicycle wheel is mounted to the subframes 12 and 52 and the various cross frame members are mounted in position. The wheel 38 of the bicycle is protected by the upper forward frame members 20 or 60, the forward frame members 28 and 80 and intermediate cross members 30 and 90 and large bulky loads of elongated material may be laid transversely on the platform at the upper portion of the subframes. If preferred, a more permanent platform, not shown, may be fastened to the upper portions of the subframes.

When the wheel barrow will not be used for a period of time the wheel 38 can be removed and if the wheel originally was taken from a bicycle, it can be replaced to its original position. The lightweight tubular frame without a wheel can easily be placed into storage. Under conditions which space is at a great premium, the embodiment in FIG. 4 can be disassembled by removing the six bolts holding the cross members in position and the embodiment seen in FIG. 1 can be disassembled by removing the four bolts holding the forward and intermediate cross member and by disengaging the rear cross member 32.

A lightweight frame of tubular material has been provided which is adapted to receive a wheel and preferably a bicycle wheel between a pair of subframes which are held in spaced apart relationship to each other by a plurality of cross members which are held in position by detachable bolts. The tubular construction forms a strong frame for carrying large bulky loads and may be disassembled for storage by simply removing the wheel or if desired can be more fully disassembled by removing the cross member folding the subframes in spaced apart relationship.

The embodiments of the invention in which an exclusive property or privilege is claimed are defined as follows:

1. A wheel barrow frame comprising: a pair of subframes, each of said subframes including a single, continuous length of tubular material forming a handle portion, an upper rear portion extending forwardly and downwardly from said handle portion, an upper front portion extending upwardly and forwardly from said upper rear portion, a front vertical portion extending substantially downwardly from said upper front portion, a lower front portion extending rearwardly from said front vertical portion, a lower rear portion extending downwardly and rearwardly from said lower front portion to provide a ground engagable rest, and a vertical rear portion extending generally upwardly from said lower rear portion; a plurality of cross members detachably connected to said subframes for maintaining said subframes in a spaced, parallel relationship, said plurality of cross members including a forward cross member extending between said subframes at a point intermediate said front vertical portion and said upper front portion, a rear cross member extending between said subframes at a point intermediate said handle portion and said upper rear portion, and an intermediate cross member extending between said subframes at a point intermediate said upper front portion and said upper rear portion, said intermediate cross member disposed between said upper portions and said lower portions; means for connecting said intermediate cross member to both said upper portions and said lower portions; an axle extending between said subframes at a point intermediate said lower front portion and said front vertical portion; and a wheel mounted on said axle between said subframes, said front cross member, said upper front portion and said intermediate cross member lying outside the perimeter of said wheel, thus forming a load carrying area.

2. A wheelbarrow frame comprising: a pair of subframes, each of said subframes including a single, continuous length of tubular material forming a handle portion, an upper rear portion extending forwardly and downwardly from said handle portion, a lower front portion extending forwardly from said upper rear portion, a front vertical portion extending substantially upwardly from said lower front portion, an upper front portion extending downwardly and rearwardly from said front vertical portion at an acute angle to said vertical portion and crossing said lower front portion on the inside of said subframe, a lower rear portion extending downwardly and rearwardly from said upper front portion to provide a ground engagable rest, and a vertical rear portion extending generally upwardly from said lower rear portion, said vertical rear portion being disposed on the exterior of said upper rear portion; a plurality of cross members detachably connected to said subframes for maintaining said subframes in a spaced, parallel relationship, said plurality of cross members including a forward cross member extending between said subframes at a point intermediate said front vertical portion and said upper front portion, a rear cross member extending between said subframes at a point intermediate said handle portion and said upper rear portion, means for connecting said vertical rear portions, and an intermediate cross member extending between said subframes at a point intermediate said upper front portion and said upper rear portion, said intermediate cross member disposed across said upper portions and said lower portions; means for connecting said intermediate cross member to said upper rear portions; and an axle extending between said subframes at a point intermediate said lower front portion and said front vertical portion; and a wheel mounted on said axle between said subframes, said front cross member, said upper front portion and said intermediate cross member lying outside the perimeter of said wheel, thus forming a load carrying area disposed at an acute angle to the vertical.

* * * * *